No. 791,244.

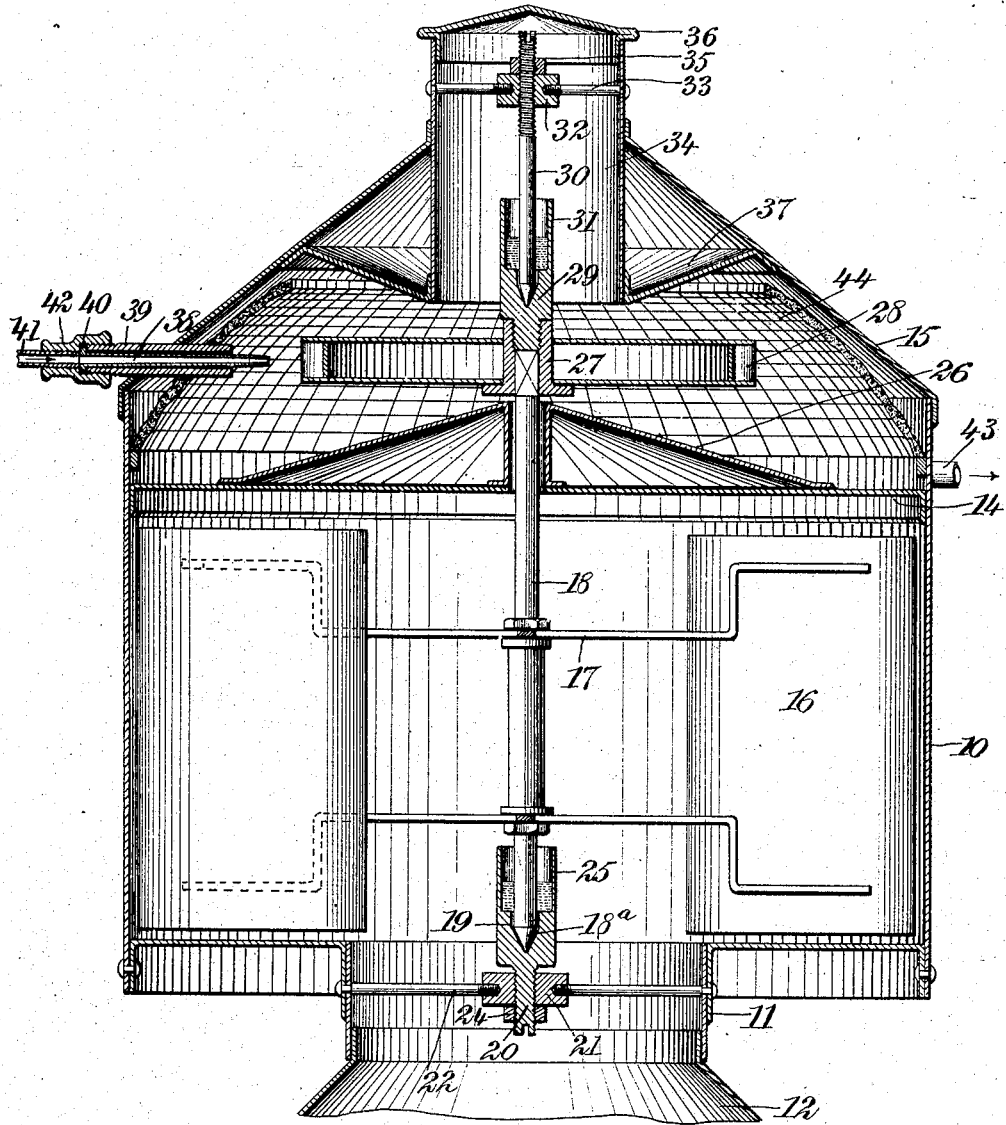

Patented May 30, 1905.

UNITED STATES PATENT OFFICE.

THEODORE M. CARPENTER AND FRED L. BAKER, OF LOS ANGELES, CALIFORNIA.

BEARING FOR VENTILATOR-SHAFTS.

SPECIFICATION forming part of Letters Patent No. 791,244, dated May 30, 1905.

Application filed April 28, 1904. Serial No. 205,308.

*To all whom it may concern:*

Be it known that we, THEODORE M. CARPENTER and FRED L. BAKER, citizens of the United States, and residents of Los Angeles, in the county of Los Angeles and State of California, have invented a new and Improved Bearing for Ventilator-Shafts, of which the following is a full, clear, and exact description.

This invention is adapted particularly to the device embodied in our prior patent, No. 703,762, dated July 1, 1902.

The special objects of the present invention are to improve the devices for mounting the ventilator-fan so that it will be securely held and enabled to operate with the least possible friction.

The invention resides in certain features of structure and organization, which will be fully set forth hereinafter and defined in the claims.

Reference is had to the accompanying drawing, representing a vertical section of the ventilator and showing our invention in operative position with respect thereto.

In said drawing, 10 indicates the body of the ventilator, which is provided at its bottom with a centrally-disposed air-inlet 11, connected with a hood 12, the same essentially as is disclosed in our prior patent above referred to. In the upper part of the body of the casing 10 is arranged a horizontal partition 14, and mounted on the top of said body 10 is a conical cover 15, which may, if desired, be loosely placed in position, so that it may be readily removed whenever desired. In the casing 10, between the bottom thereof and the partition 14, is arranged a fan comprising plates 16, arms 17, and a central shaft 18, to which the arms are fastened in any desired manner. Said shaft is preferably tapered at its lower end, as indicated at 18$^a$, and this end is mounted in a stepped bearing 19, formed according to the tapered end 18$^a$, and is provided with a screw-shank 20. This shank is fitted in a correspondingly-threaded supporting-block 21, sustained centrally in the air-inlet 11 by radial arms 22.

24 indicates a lock-nut working on the threaded shank 20, and in this manner the position of the bearing 19 may be readily adjusted. The said bearing is provided above the bearing proper with a cup 25, which preferably is formed integral with the bearing, but which may be otherwise formed, if desired. This cup incloses the lower part of the shaft 18 and is intended to receive a lubricating-oil, so as to keep the same continually in the bearing 19, and thus allow the shaft 18 to be rotated with the least friction possible. If desired, the upper end of the cup 25 may be closed in any desired manner— for instance, by the application of a fabric stuffing.

The shaft 18 passes loosely through an opening in the partition 14 and through a conical water-shed 26, which is placed thereon. Attached to the upper end of the shaft 18 is the hub 27 of a water-motor 28, which may be of any form desired, this motor running horizontally around the axis of the vertical shaft 18. Secured to the said hub 27 is a bearing 29, tapered to receive the tapered end of a sustaining-pin 30. Said bearing 29 has a cup 31 rising therefrom similar to the cup 25, before described, and also adapted to contain a lubricant. This provides a very light running bearing at the top as well as at the bottom of the shaft 18. The sustaining-pin 30 is threaded and works in a correspondingly-threaded block 32 and sustained by radial arms 33, fastened in a hood 34, which forms part of the cover 15, as shown. A lock-nut 35 also coacts with the threaded pin 30, so as to secure the pin in any desired adjustment. The hood 34 has a removable cover 36, and its lower part within the body of the cover 15 is secured by a dished web 37.

The motor 28 is operated by a jet of water from the fluid-tank the same as our prior patent, and said nozzle comprises a nozzle proper, 38, which is removably fitted in a tube 39. This tube 39 passes, preferably, through the cover 15 and is secured therein by solder or other means. Said tube is threaded at its outer end, and the nozzle 38 has an annular flange 40 formed on its corresponding end, so as to facilitate securely joining the parts 38 and 39 to the water-supply pipe 41 by means of a union 42, as shown. In this manner the nozzle is securely mounted in its correct position, but may be readily removed by backing off the connection 42 and withdrawing the nozzle from the tube 39. The water passing from the nozzle strikes the motor-wheel 28 and imparts a rotary movement to the shaft 18, and the water falling from the wheel collects on the partition 14 and passes off by an outlet 43, leading to any suitable receiver.

In order to deaden the sound of the water operating the motor, we provide a non-resonant cover 44, which is placed in the body 10 above the partition 14 and which arches upward and inward in close proximity to the web 37, thus covering the peripheral part of the motor. The nozzle passes through this covering, as the drawing illustrates, and it will be seen that this sound-deadening cover 44 throws downward on the partition 14 such water as may strike the sound-deadening cover and confines the noise of the rushing water to the space inclosed by the cover or shield. This sound-deadening or non-resonant shield or cover may be formed of any suitable material; but we prefer to employ a woven-wire frame and a mass of oakum suitably secured thereto. The oakum not only effectively takes the sound, but resists the action of the water and is therefore durable.

The foregoing description being of but a single embodiment of our invention, we would point out that various changes in the details may be resorted to without departing from the spirit of the invention as defined in the claims.

Having thus described our invention, we claim as new and desire to secure by Letters Patent—

1. The combination with a support of a step-bearing, a vertical shaft mounted thereon, a bearing attached to the upper end of the shaft, a lubricant-cup rising from said last-mentioned bearing, and a sustaining-pin passing through the lubricant-cup and engaged with the second-named bearing.

2. The combination of a support, a step-bearing having a threaded shank engaged in the support, an oil-cup rising from the said bearing, a vertical shaft passing through the oil-cup and having its lower end engaged in the step-bearing, a bearing attached to and turning with the upper end of the vertical shaft, an oil-cup rising from said latter bearing, a sustaining-pin projecting through the oil-cup and engaged with the second bearing, and a second support with which said sustaining-pin is connected.

3. The combination of a step-bearing, means for mounting the same, an oil-cup rising from said bearing, a vertical shaft passing through the oil-cup and mounted in the step-bearing, a bearing attached to the upper end of the vertical shaft, an oil-cup rising from the second bearing, a sustaining-pin projecting through the second oil-cup and engaged with the second bearing, and means for mounting the sustaining-pin in place.

In testimony whereof we have signed our names to this specification in the presence of two subscribing witnesses.

THEODORE M. CARPENTER.
FRED L. BAKER.

Witnesses:
H. C. LICHTENBERGER,
HENRY E. CARTER.